United States Patent
Feiner et al.

(10) Patent No.: US 12,070,701 B2
(45) Date of Patent: Aug. 27, 2024

(54) PROCESS FOR THE RECOVERY OF SOLVENT FROM SOLVENT-CONTAINING CELLULOSIC PARTICLES

(71) Applicant: LENZING AKTIENGESELLSCHAFT, Lenzing (AT)

(72) Inventors: Roland Feiner, Lenzing (AT); Thi Huyen Trang Trinh, Lenzing (AT); Christian Sperger, Schorfling (AT)

(73) Assignee: Lenzing Aktiengesellschaft, Lenzing (AT)

( * ) Notice: Subject to any disclaimer, the term of this patent is extended or adjusted under 35 U.S.C. 154(b) by 198 days.

(21) Appl. No.: 17/771,348

(22) PCT Filed: Oct. 21, 2020

(86) PCT No.: PCT/EP2020/079559
§ 371 (c)(1),
(2) Date: Apr. 22, 2022

(87) PCT Pub. No.: WO2021/078767
PCT Pub. Date: Apr. 29, 2021

(65) Prior Publication Data
US 2022/0387905 A1  Dec. 8, 2022

(30) Foreign Application Priority Data
Oct. 25, 2019 (EP) .................................. 19205226

(51) Int. Cl.
*B01D 11/02* (2006.01)
*D01F 13/02* (2006.01)

(52) U.S. Cl.
CPC ...... *B01D 11/0219* (2013.01); *B01D 11/0292* (2013.01); *D01F 13/02* (2013.01)

(58) Field of Classification Search
CPC .. B01D 11/0219; B01D 11/0292; D01F 13/02
See application file for complete search history.

(56) References Cited

U.S. PATENT DOCUMENTS 4,237,110 A * 12/1980 Forster .................. C01B 7/0737
127/46.1
6,902,690 B1 * 6/2005 Niemz .................... C08B 16/00
425/382.2

(Continued)

FOREIGN PATENT DOCUMENTS

CN          104711706 A       6/2015

*Primary Examiner* — Jonathan Miller
(74) *Attorney, Agent, or Firm* — Venable LLP

(57) ABSTRACT

A process (100) for the recovery of solvent (1) from solvent-containing cellulosic particles (2) is shown, the process comprising the steps: a) extracting the solvent (1) from the cellulosic particles (2) by means of a liquid extraction medium (3), thereby obtaining a solvent-enriched extraction medium (5), and b) obtaining the recovered solvent (6) from the solvent-enriched extraction medium (5). In order to improve the efficiency of the process, it is proposed that in step a) the solvent (1) is extracted from the cellulosic particles (2) in a continuous flow extraction reactor (4), wherein the extraction medium (3) continuously flows through the extraction reactor (4) to extract the solvent (1) from the cellulosic particles (2).

13 Claims, 3 Drawing Sheets

(56) References Cited

U.S. PATENT DOCUMENTS

| | | | | |
|---|---|---|---|---|
| 8,317,503 B2* | 11/2012 | Zikeli | ............... | D01D 5/06 |
| | | | | 425/464 |
| 9,574,799 B2* | 2/2017 | Buese | ............... | F25B 13/00 |
| 2015/0041084 A1* | 2/2015 | Pan | ............... | D21H 17/14 |
| | | | | 162/76 |
| 2015/0233055 A1* | 8/2015 | Fallon | ............... | D21H 11/00 |
| | | | | 162/100 |
| 2016/0091226 A1* | 3/2016 | Buese | ............... | F25B 13/00 |
| | | | | 422/284 |
| 2016/0186066 A1* | 6/2016 | Powell | ............... | D21C 3/222 |
| | | | | 585/242 |
| 2017/0166662 A1* | 6/2017 | Alonso | ............... | C08H 8/00 |

* cited by examiner

PROCESS FOR THE RECOVERY OF SOLVENT FROM SOLVENT-CONTAINING CELLULOSIC PARTICLES

The present application is a national-stage entry under 35 U.S.C. § 371 of International Patent Application No. PCT/EP2020/079559, published as WO 2021/078767 A1, filed Oct. 21, 2020, which claims priority to EP 19205226.4, filed Oct. 25, 2019, the entire disclosure of each of which is hereby incorporated by reference.

BACKGROUND OF THE INVENTION

Technical Field

The present invention relates to a process for the recovery of solvent from solvent-containing cellulosic particles, comprising the steps: a) extracting the solvent from the cellulosic particles by means of a liquid extraction medium, thereby obtaining a solvent-enriched extraction medium, and b) obtaining the recovered solvent from the solvent-enriched extraction medium.

Background Art

Reducing the environmental footprint of production processes, in particular in the field of regenerated cellulosic molded body production, has become an increasingly important objective of the industry.

Especially the handling of production wastes from plants producing regenerated cellulosic molded bodies, such as lyocell fibers, raises several challenges: such production wastes usually contain significant amounts of solvents, which makes them unsuitable for direct disposal or possible further processing. On the other hand, extracting the solvents from the production wastes consumes large amounts of water or other extraction agents and on the other hand said solvents in waste water streams effectively increase the load and chemical oxygen demand of the waste water treatment facilities. Therefore it is desirable to recover the solvents from said production wastes.

In CN 104711706 A, a recovery device, for the recovery of a direct dissolution solvent (NMMO) from lyocell dope waste is disclosed, whereby the dope waste is extruded into strips, said strips are cooled and subsequently crushed into small pellets. In order to recover the solvent from the pellets, the pellets are subjected to a leaching device in a batch process, whereby the pellets are soaked in a leaching liquid several times for about 24 hours each. In order to reach low residual contents of solvent in the cellulosic pellets, large amounts of leaching liquid (water) are necessary. Furthermore, several leaching cycles are necessary, rendering such process for the recovery of solvent very slow and inefficient.

DISCLOSURE OF INVENTION

It is therefore an object of the present invention to provide an improved process of the type initially mentioned, which has a higher efficiency in recovering solvent.

The stated object is inventively achieved by a method according to independent claim 1.

If in step a) the solvent is extracted from the cellulosic particles in a continuous flow extraction reactor, the water consumption can be effectively reduced and an efficient recovery process may be obtained. In a batch-type process according to prior art, where the cellulosic particles are soaked in the extraction medium for a certain amount of time, the transport of solvent from the cellulosic particles to the extraction medium is dominated by an equilibration effect, thus the concentrations of solvent inside the cellulosic particles and in the extraction medium tend to equalize with time, as the solvent—driven by a concentration gradient—slowly diffuses from the core to the outer shell of the cellulosic particles and eventually enters the extraction medium in contact with the cellulosic particles. Since the efficiency of this diffusion-driven extraction process depends on the solvent concentration gradient inside the cellulosic particles and between the cellulosic particles and the extraction medium, this batch-type processes are slow and require a large number of cycles with fresh extraction medium to finally reach low residual concentrations of solvent in the cellulosic particles. In the inventive process, due to the continuous flow of extraction medium through the extraction reactor, a constant supply of fresh extraction medium to the cellulosic particles may be provided. This ensures, that the difference between concentrations of solvent in the extraction medium and in the cellulosic particles is maximized at all times, leading to a steep concentration gradient from the cellulosic particles to the extraction medium. The large concentration gradient therefore enables a constant transport of solvent from the cellulosic particles to the extraction medium and also ensures a steep concentration gradient inside the cellulosic particles, thereby driving the diffusion of solvent from the core of the cellulosic particles via their outer shell to the extraction medium. Thus, the extraction medium is constantly enriched with the solvent during its flow through the extraction reactor in step a) of the extraction process. The solvent-enriched extraction medium can then, in step b), be used to obtain the recovered solvent.

The inventive process may be advantageously employed, if the aqueous suspension of solvent-containing cellulosic particles is a comminuted cellulosic scrap or waste from production processes for regenerated cellulosic molded bodies. In such processes, a suitable solvent is used to dissolve cellulose or derivatized cellulose.

More preferably, the solvent-containing cellulosic particles are obtained from production waste of a lyocell process. In particular, the production waste thereby is a spinning dope waste from a lyocell process. Such spinning dope waste may be for example dope waste obtained from bleeding a filmtruder or production lines, or waste of unwashed cellulosic molded bodies obtained during spin-up. The solvent, contained in the cellulosic particles thereby is a direct dissolution solvent for cellulose, such as an amine oxide, in particular N-Methylmorpholine-N-oxide (NMMO), or an ionic liquid.

Furthermore, an easy and reliable process may be provided, if the extraction medium is water. Water is in particular a suitable extraction medium, if the solvent is a water-soluble solvent, for example such as NMMO. Thus, the process herein described is in particular suitable for the recovery of solvent from solvent-containing cellulosic particles by means of a liquid extraction medium, where the cellulosic particles are obtained from spinning dope waste of a lyocell process, the solvent is NMMO and the extraction medium is water, in other words for the recovery of NMMO from NMMO-containing lyocell spinning dope waste using water as liquid extraction medium.

The reproducibility of the aforementioned process may be further improved, if the empty extraction reactor is first filled with the solvent-containing cellulosic particles prior to step a). The inventive process may therefore be conducted in a discontinuous fashion, where the extraction reactor is filled with a fresh batch of solvent-containing cellulosic particles and the solvent is then extracted from the cellulosic particles via the continuous flow of extraction medium through the extraction reactor.

A technically easier process may be provided, if the cellulosic particles are contained in an aqueous suspension when filling the empty extraction reactor with the solvent-containing cellulosic particles. Suspending the cellulosic particles in an aqueous solution can namely improve the handling properties of the cellulosic particles, since non-suspended comminuted solvent-containing cellulosic particles usually exhibit a fairly high viscosity, thus leading to bad flow characteristics.

If excess liquid is removed from the suspension prior to filling the extraction reactor with the suspension, the effectiveness of the extraction of the solvent can be further improved. During comminution and preparation, the solid concentration of cellulosic particles in the suspension is relatively low, thus, filling the extraction reactor directly with the suspension is very inefficient, as it would effectively contain mostly liquid. In order to increase the solid content in the extraction reactor and thus the efficiency of the process, excess liquid is desirably drained from the suspension prior to filling the extraction reactor. Hence, a fast and efficient process may be provided.

An easy and reliable process may be further provided, if the suspension is filled via a bow-shaped sieve into the extraction reactor in order to remove excess liquid from the suspension. Preferably, only the excess liquid may pass the sieve, while the cellulosic particles flow over the surface of the sieve into the extraction reactor, thus being separated from the excess liquid.

The continuous extraction of solvent from the cellulosic particles in step a) can be performed in a reliable and efficient way, if the extraction reactor has a top inlet and bottom sieve outlet for the extraction medium. Fresh extraction medium may thereby be continuously fed to the extraction reactor through the top inlet. The extraction medium then flows though the extraction reactor filled with the solvent-containing cellulosic particles, thereby being enriched with the solvent. At the bottom of the extraction reactor, the solvent-enriched extraction medium then exits the extraction reactor through the bottom sieve outlet. The bottom sieve outlet may thereby be preferably configured, such that only extraction medium can exit the extraction reactor through it. The flow of extraction medium from top to bottom in the extraction reactor can advantageously increase the efficiency of solvent extraction, in particular if the solvent has a higher specific density than the extraction medium. This is particularly true, if the solvent is a solvent for dissolution of cellulose, such as direct dissolution solvents like NMMO or ionic liquids. Through the top-to bottom flow of extraction medium, a desirable solvent concentration gradient between the extraction medium and the cellulosic particles can be maintained throughout the extraction reactor.

Further in the above mentioned process, the solvent-enriched extraction medium is obtained from the extraction medium exiting the bottom sieve outlet of the extraction reactor. Due to the flow of the extraction medium from top to bottom in the extraction reactor, the solvent-enriched extraction medium with the highest concentration of solvent accumulates at the bottom of the extraction reactor, thus a constant supply of solvent-enriched extraction medium for the recovery of solvent may be obtained from the bottom sieve outlet of the extraction reactor.

The efficiency of the process can be further improved, if the extraction medium continuously flows through the extraction reactor, until a content of solvent in the solvent-enriched extraction medium below a predefined residual value is reached. By continuously monitoring the concentration of solvent in the solvent-enriched extraction medium, a very reliable measure for the residual concentration of solvent in the cellulosic particles may be provided, thus providing means for the decision when the flow of extraction medium can be stopped. Thereby, the amount of extraction medium sufficient for the extraction of the solvent from the cellulosic particles to a defined residual concentration of solvent in the cellulosic particles, may be further reduced.

Suitable means for determining the concentration of solvent in the solvent-enriched extraction medium can be for example conductivity measurements of the extraction medium inside or after leaving the extraction reactor.

The aforementioned advantages may be further improved, if the concentration of solvent is continuously monitored at the bottom of the extraction reactor, more particularly at the bottom sieve outlet of the extraction reactor. Since the highest concentration of solvent in the solvent-enriched extraction medium is found at the bottom of the extraction reactor, a more reliable process may be provided, if the continuous flow of extraction medium is stopped after reaching a concentration of solvent below a predefined residual value in the solvent-enriched extraction medium exiting the bottom sieve outlet of the extraction reactor.

If after a content of solvent in the extraction medium below the predefined residual value is reached, the continuous flow of extraction medium through the extraction reactor is stopped and the extraction reactor is emptied, an easy and reliable discontinuous process for the extraction of solvent from a batch of cellulosic particles may be provided. After stopping the flow of extraction medium, the excess extraction medium in the extraction reactor may drain through the bottom sieve outlet. The essentially solvent-free cellulosic particles in the extraction reactor, from which the solvent has been extracted, can then leave the extraction reactor through a bottom outlet. After the extraction reactor has been emptied, it may be refilled with a new batch of fresh solvent-containing cellulosic particles and the continuous flow of extraction medium can be started again. Alternatively, a residual amount of excess extraction medium may be kept in the extraction reactor to help emptying the extraction reactor through the bottom outlet.

A more environmentally friendly process may be provided, if after emptying the extraction reactor, the essentially solvent-free cellulosic particles obtained from emptying the extraction reactor are pressed and/or dried. After extracting the solvent, the essentially solvent-free cellulosic particles may still contain excess extraction solution, which may be removed in a further step after emptying the extraction reactor. To this behalf, the essentially solvent-free cellulosic particles can be pressed to remove the excess extraction solution, thus, reducing the loss of extraction solution. Furthermore, the essentially solvent-free cellulosic particles may be dried to obtain a final dried solvent-free cellulosic product. This may enable to efficiently use all resources by recovering both the solvent and the cellulosic particles from the initial waste. Pressing the essentially solvent-free cellulosic particles may be executed for example by feeding said particles through a FAN separator or a centrifuge.

A very reliable extraction of the solvent may be provided, if the residual solvent-content of the essentially solvent-free cellulosic particles after extraction is less than 500 mg/kg$_{Cell}$, where mg/kg$_{Cell}$ stands for the solvent content in mg per kg of cellulosic particles. At the same time the efficiency of the process may be greatly improved, if the total consumption of extraction medium is less than 50 kg/kg$_{Cell}$, i.e. less than 50 kg of extraction medium per kg of cellulosic particles.

Finally, the recovered solvent may be obtained from the collected solvent-enriched extraction medium.

The inventive process may be advantageously used to produce cellulosic particles, where spinning dope is extruded into an underwater granulator to produce the cellulosic particles and where solvent is extracted from the cellulosic particles in a process according to any of claims 1 to 14 and finally dried and essentially solvent-free cellulosic particles are obtained.

BRIEF DESCRIPTION OF THE DRAWINGS

In the following, the invention is exemplified based on embodiments with reference to the drawings. In particular

MODES FOR CARRYING OUT THE INVENTION

Figure 1:
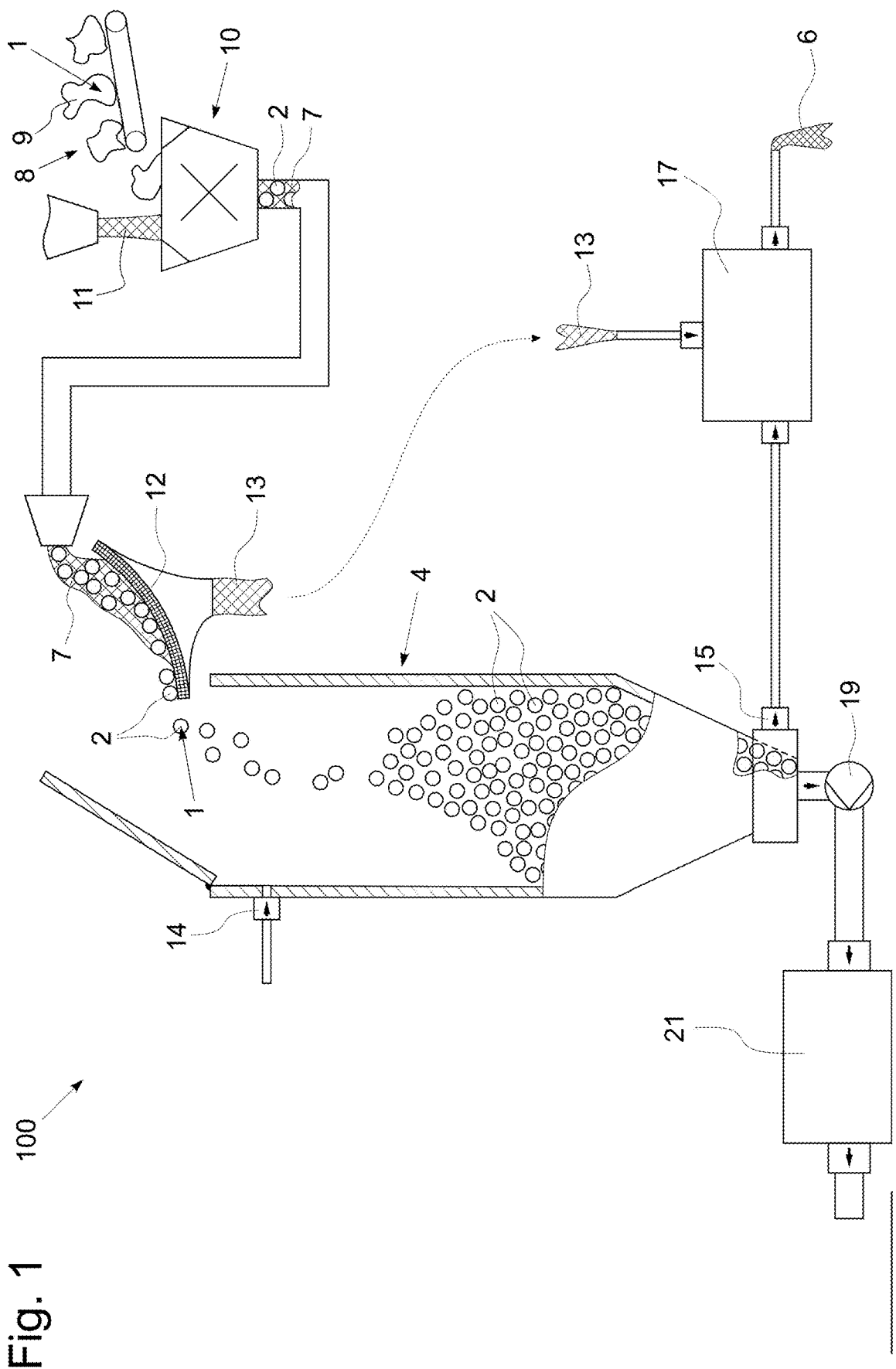
FIG. 1 shows a schematic view of the process according to a first embodiment in a first process step.
Figure 2:
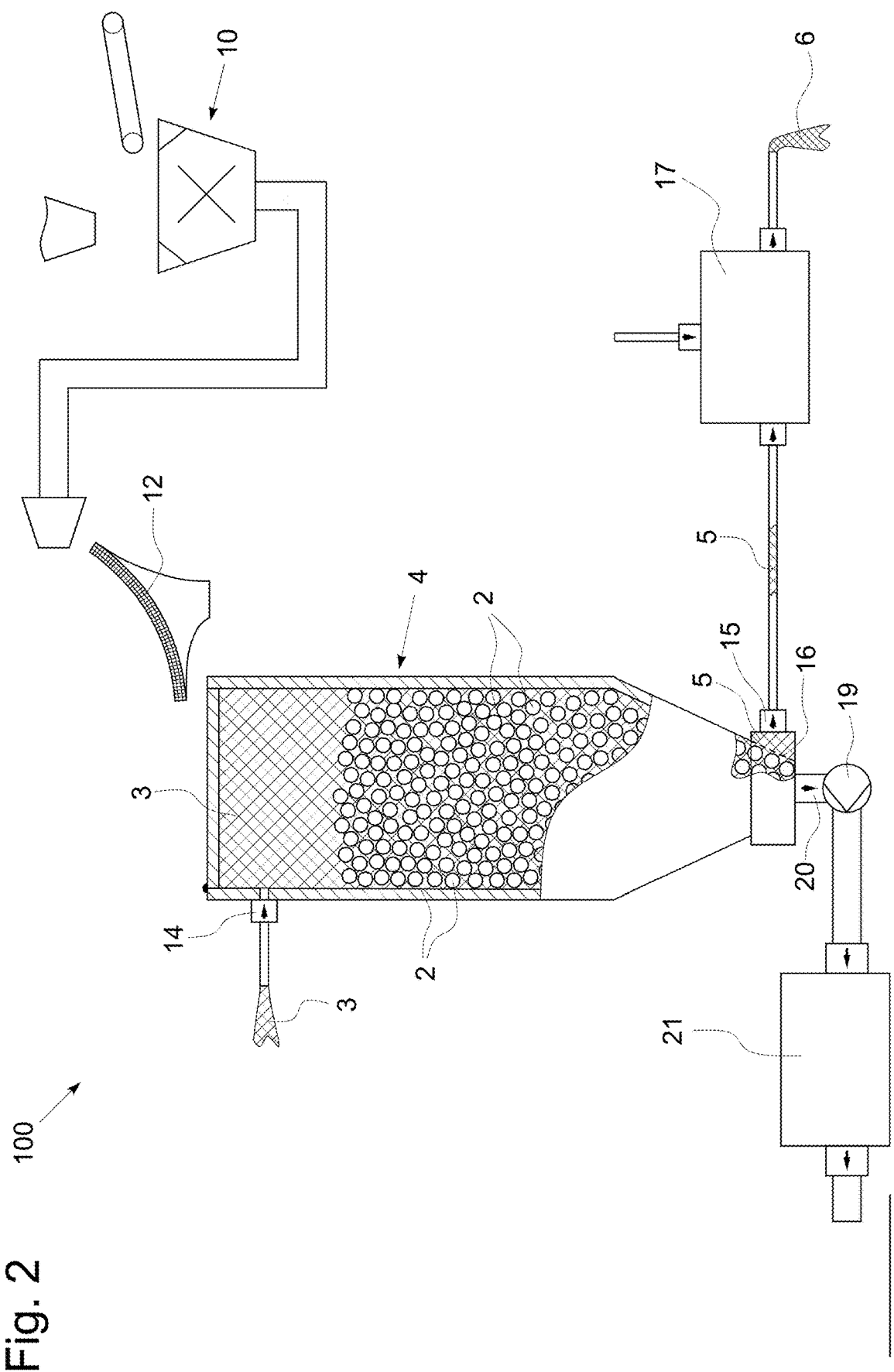
FIG. 2 shows a schematic view of the process from FIG. 1 in a second process step.
Figure 3:
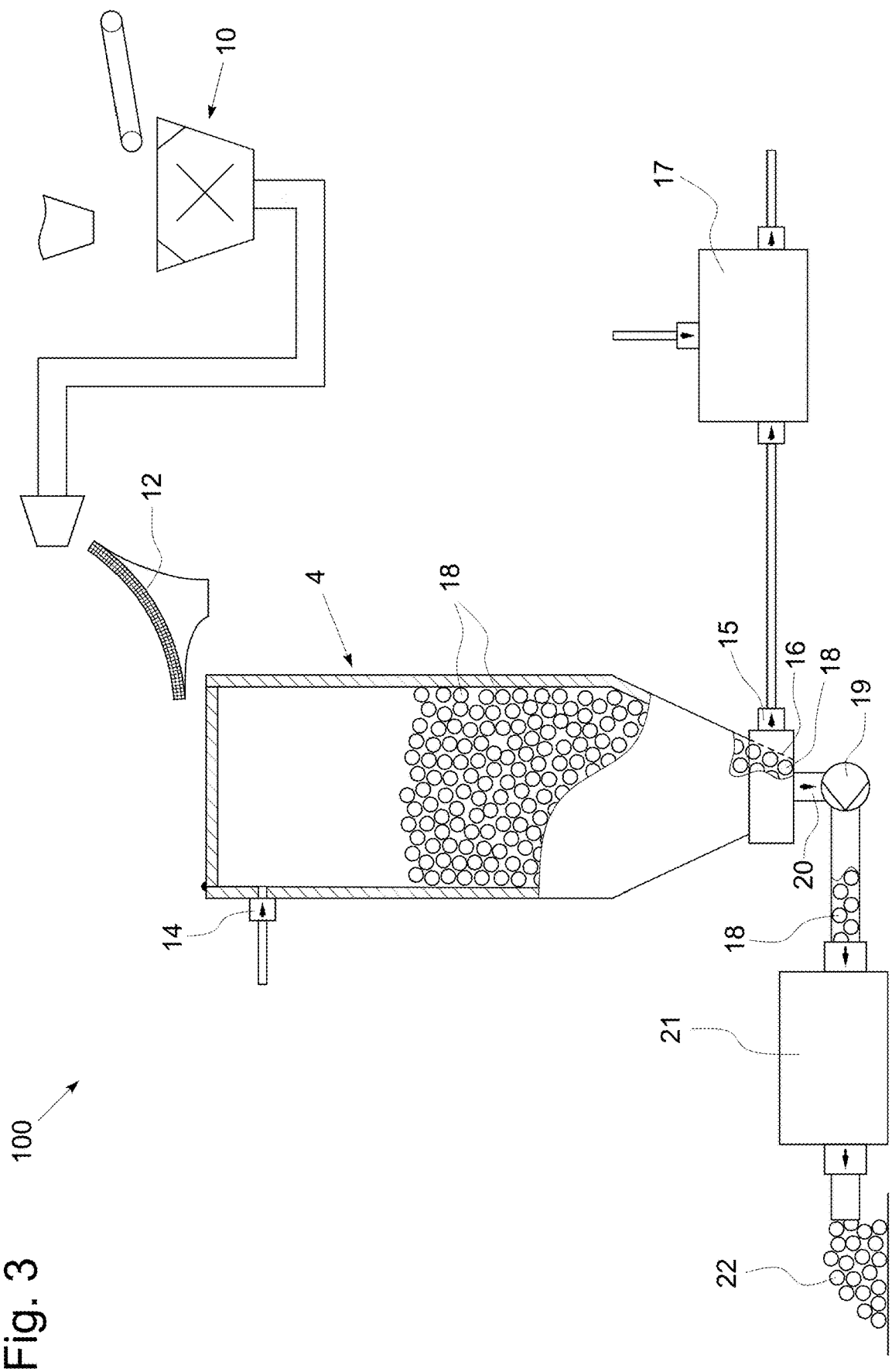
FIG. 3 shows a schematic view of the process from FIG. 1 in a third process step.

In FIGS. 1 to 3, the process 100 for the recovery of solvent 1 from solvent-containing cellulosic particles 2, according to a first embodiment of the invention, is shown. The process 100 according to the first embodiment comprises the following steps:

a) Filling the empty extraction reactor 4 with an aqueous suspension 7 containing the solvent-containing cellulose particles 2 and water as aqueous medium 11, b) extracting the solvent 1 from the cellulosic particles 2 by means of a liquid extraction medium 3, more particularly water, in the continuous flow extraction reactor 4, wherein the extraction medium 3 continuously flows through the extraction reactor 4 from top to bottom to extract the solvent 1 from the cellulosic particles 2 into the extraction medium 3, thereby obtaining a solvent-enriched extraction medium 5, and c) obtaining the recovered solvent 6 from the solvent-enriched extraction medium 5 exiting the bottom sieve outlet 15 of the extraction reactor 4.

Thus, in the process 100, the solvent 1 is extracted from the solvent-containing cellulosic particles 2 by means of a liquid extraction medium 3 in a continuous flow extraction reactor 4. The liquid extraction medium 3 continuously flows through the extraction reactor 4 and is enriched with solvent 1 from the cellulosic particles 2 and thus forms a solvent-enriched extraction medium 5. Said solvent-enriched extraction medium 5 can then be collected upon leaving the extraction reactor 4 and the recovered solvent 6 may be obtained from it.

In FIG. 1 a first step of the process 100 is depicted in more detail. The empty extraction reactor 4 is initially filled with the solvent-containing cellulosic particles 2 before the extraction of the solvent 1 may be started. In the present embodiment, the cellulosic particles 2 are filled into the extraction reactor 4 by using an aqueous suspension 7, containing the cellulosic particles 2. The aqueous suspension 7 enables better handling of the cellulosic particles 2, which otherwise tend to exhibit very disadvantageous flowing properties. In the present embodiment, the cellulosic particles 2 are initially obtained from production waste 8 of a lyocell process for the production of regenerated cellulosic molded bodies. Such production waste 8, which contains solvent 1, is in particular spinning dope waste 9 from a lyocell plant, for example obtained from bleeding a filmtruder or spinning dope lines, or obtained during extrusion of the regenerated cellulosic molded bodies. Usually the spinning dope waste 9 is a collection and mixture of waste from different source as mentioned above, and thus, contains a varying concentration of solvent 1. In this case, the solvent 1 is a direct dissolution solvent for cellulose, in particular an amine oxide like NMMO or any ionic liquid, and the spinning dope waste 9 originates from different stages of a lyocell plant. Thus, in the present embodiment, water is used as an extraction medium 3 to reclaim the solvent 1 from the spinning dope waste 9. Since the spinning dope waste 9 receives no further treatment prior to the present process 100, it is an at least partly uncoagulated solution of cellulose, wherein the cellulose is dissolved in the solvent 1, exhibiting a very high viscosity. Thus, to be able to easily handle the spinning dope waste 9 and efficiently extract the solvent 1 from it, it is first comminuted in a shredder 10 to form the solvent-containing cellulosic particles 2. Thereby, the spinning dope waste 9 and an aqueous medium 11 are added to the shredder 10, in order to both comminute and coagulate the spinning dope waste 9. In the present case of a lyocell spinning dope waste 9, the aqueous medium 11 may be preferably water, but it is equally possible to use any other compatible medium. The aqueous medium 11 is in particular identical to the extraction medium 3, used to extract the solvent 1 from the cellulosic particles 2 in the extraction reactor 4, in order to ensure high compatibility with the further extraction process, thus, additional washing or cleaning steps can be omitted. The solvent-containing cellulosic particles 2 obtained from the shredder 10 are contained in a suspension 7, with the liquid being the aqueous medium 11.

In a further embodiment, the shredder 10 may thereby be an underwater granulator, wherein the spinning dope waste 9 is fed through a rotating knife into a stream of water to form the cellulosic particles 2, which is not depicted in the figures.

As shown in FIG. 1, the suspension 7 is further fed into the extraction reactor 4 via a bow sieve 12 to remove the excess liquid 13 from the suspension 7. The bow sieve 12 is shaped in a way, that the cellulosic particles 2 cannot pass through the bow sieve 12, but flow along the top surface into the extraction reactor 4, while the excess liquid 13 may pass the bow sieve 12 and is collected. The excess liquid 13 contains essentially the aqueous medium 11, used to comminute the spinning dope waste 9, but may further contain solvent 1 extracted from the cellulosic particles 2. Depending on the amount of solvent 1 in the excess liquid 13, it may be preferable to also use it for obtaining the recovered solvent 6.

FIG. 2 shows the process 100 in a second process step. After filling the extraction reactor 4 with the cellulosic particles 2, the continuous flow of extraction medium 3 is started. The extraction medium 3 thereby enters the extraction reactor 4 through a top inlet 14 and flows between the cellulosic particles 2 towards the bottom of the extraction reactor 4. In the present embodiment, said top inlet 14 is arranged at the top side of the extraction reactor 4, whereas in a further embodiment, the top inlet 14 is arranged at the top of the extraction reactor 4. In an even further embodiment, the extraction medium 3 is homogeneously distributed over the whole extraction reactor 4 when entering the top inlet 14.

By flowing between the cellulosic particles 2, the extraction medium 3 gets in contact with the cellulosic particles 2, whereby solvent 1 is extracted from the cellulosic particles 2 into the extraction medium 3, thereby forming the solvent-enriched extraction medium 5. Said solvent-enriched extraction medium 5 is then obtained from a bottom sieve outlet 15 of the extraction reactor 4. The bottom sieve outlet 15 therefore comprises a sieve 16, which is permeable for the solvent-enriched extraction medium 5 but holds back the cellulosic particles 2. It is thus possible to continuously supply fresh extraction medium 3 to the extraction reactor 4 via the top inlet 14 and continuously obtain solvent-enriched extraction medium 5 from the bottom sieve outlet 15. The solvent-enriched extraction medium 5 exiting the bottom sieve outlet 15 is then fed through a solvent recovery device 17, in which the recovered solvent 6 is reclaimed from the solvent-enriched extraction medium 5.

Such a solvent recovery device 17 may be any device that is able to recover solvent from the solvent-enriched extraction medium 5, such as any combination of flotation, ion exchange, evaporation, etc. In one embodiment, in the solvent recovery device 17, a number of pre-purification steps may be followed by an evaporation of the excess water.

In a further embodiment, the excess liquid 13 obtained from the bow sieve 12 while filling the extraction reactor 4, is also fed through the solvent recovery device 17 to obtain recovered solvent 6. This is indicated in FIG. 1 by the second, dashed feed line into the solvent recovery device 17.

In one preferred embodiment, extraction medium 3 is continuously supplied to the extraction reactor 4 via the top inlet 14 until the concentration of solvent 1 in the solvent-enriched extraction medium 5, obtained from the bottom sieve outlet 15, falls below a predefined concentration value. Said concentration value may be chosen in accordance with the requirements on maximum residual concentration of solvent 1 in the cellulosic particles 2 and the constraints on maximum amount of extraction medium 3 used in the process 100. The concentration of solvent 1 in the solvent-enriched extraction medium 5 can be measured and monitored permanently, e.g. by means of a conductivity measurement. When the solvent-enriched extraction medium 5 reaches a concentration of solvent 1 below the predefined values, the continuous flow of fresh extraction medium 3 is stopped.

In FIG. 3, the process 100 is depicted in a third process step, after the extraction and the continuous flow of extraction medium 3 has been stopped. The solvent-enriched extraction medium 5 has been drained from the extraction reactor 4, leaving only the solvent-extracted cellulosic particles 18 in the extraction reactor 4. The extraction reactor 4 is then emptied and the solvent-extracted cellulosic particles 18 are fed through a pump 19 connected to the bottom outlet 20 of the extraction reactor 4. The pump 19 further transports the solvent-extracted cellulosic particles 18 into a dewatering device 21, where the residual solvent-enriched extraction medium 5 contained in the solvent-extracted cellulosic particles 18 is removed. The dried cellulosic particles 22, leaving the dewatering device 21, are then essentially free from solvent 1 and substantially dry.

In another embodiment, which is not further depicted in the figures, a residual amount of solvent-enriched extraction medium 5 may be left in the extraction reactor 4 prior to emptying, in order to improve the flowing properties of the solvent-extracted cellulosic particles 18 through the pump 19 and the bottom outlet 20 of the extraction reactor 4.

In one embodiment, the dewatering device 21 comprises a FAN separator, where the solvent-extracted cellulosic particles 18 are pressed to remove the residual solvent-enriched extraction medium 5. In another embodiment, the dewatering device 21 comprises a centrifuge, where the cellulosic particles 18 are centrifuged to remove the residual solvent-enriched extraction medium 5. In yet another embodiment, the dewatering device 21 may also comprise a dryer, following a FAN separator, centrifuge or the like, to further remove excess liquid from the cellulosic particles in order to obtain dried cellulosic particles 22.

EXAMPLES

In the following, the herein described process is demonstrated according to a number of examples.

In the Examples 1 to 3, a batch of solvent-containing cellulosic particles is treated with the present inventive process to obtain recovered solvent. The solvent-containing cellulosic particles are obtained from the spinning dope waste of a lyocell process. Said lyocell spinning dope waste, comprising cellulose and NMMO as a solvent, was comminuted with added water to form a suspension of solvent-containing cellulosic particles with a mean size of approximately 3 to 5 mm. The suspension containing the cellulosic particles was then filled into an extraction reactor via a bow sieve to properly dewater the cellulosic particles. The extraction reactor thereby had an active volume of 2 m$^3$ and a total cellulosic particle filling mass of 184 kg. Water as extraction medium was then continuously flown through the extraction reactor to extract NMMO from the cellulosic particles until a desired residual concentration of NMMO in the cellulosic particles was reached.

In Table 1, the results of Examples 1 to 3 are summarized.

In Example 1, the extraction medium was continuously fed through the extraction reactor, until the residual concentration of NMMO in the cellulosic particles reached a value below 10000 mg per kg of cellulosic particles. After emptying the extraction reactor, the cellulosic particles were measured to contain a NMMO residual content of 6808 mg/kg$_{Cell}$. Thereby, a total of 17.4 kg of water per kg of cellulosic particles were fed through the extraction reactor. The complete extraction cycle was finished in approximately 5 hours. The solvent-enriched extraction medium (NMMO—water solution) obtained at the end of the extraction had a NMMO concentration of 0.48%.

Example 2 was similarly conducted to Example 1, but the extraction medium was continuously fed through the extraction reactor, until a residual concentration of NMMO in the cellulosic particles below 500 mg/kg$_{Cell}$ was reached, whereby a total water consumption of 30.7 kg/kg$_{Cell}$ was needed and the total extraction time amounted to approx. 6 hours. After emptying the extraction reactor, the cellulosic particles contained 464 mg/kg$_{Cell}$ NMMO. The obtained solution of NMMO in water finally had a NMMO concentration of 0.05%.

Similarly, in Example 3 the extraction medium was continuously fed through the extraction reactor, until a residual concentration of NMMO in the cellulosic particles below 50 mg/kg$_{Cell}$ was reached, whereby a total water consumption of 41.9 kg/kg$_{Cell}$ was needed and the total extraction time amounted to 4 hours. After emptying the extraction reactor, the cellulosic particles contained less than 36 mg NMMO per kg$_{Cell}$. The obtained solution of NMMO in water finally had a NMMO concentration of 0.02%.

Furthermore, in Comparative Examples 1 and 2, the cellulosic particles were extracted by means of a batch process in a stirred vessel according to the state of the art. The cellulosic particles were therefore obtained by comminuting a lyocell spinning dope as described above and subsequently filled in the stirred vessel. In several cycles, the stirred vessel was then filled with water, the cellulosic particles-water mixture stirred for a certain amount of time, and the water drained again from the vessel. This cycle is then repeated several times.

The results for Comparative Examples 1 and 2 are summarized in Table 1.

In Comparative Example 1, 2 extraction cycles (2 stages) as described above were performed. After finishing the extraction, the residual content of NMMO in the cellulosic particles was determined to be 35000 mg/kg$_{Cell}$. The extraction took 2 hours, whereby a total amount of 101 kg/kg$_{Cell}$ of water was consumed.

In Comparative Example 2, 11 extraction cycles (2 stages) were similarly performed. A residual content of NMMO in the cellulosic particles was determined to be 500 mg/kg$_{Cell}$ after the extraction. The extraction took 11 hours, whereby a total amount of 288 kg/kg$_{Cell}$ of water was consumed.

TABLE 1

Examples 1 to 3 and Comparative Examples 1 and 2

| | Water consumption [kg/kg$_{Cell}$] | Residual NMMO content [mg/kg$_{Cell}$] | NMMO concentration [%] | Extraction time [h] |
|---|---|---|---|---|
| Example 1 | 17.4 | 6808 | 0.48 | 5 |
| Example 2 | 30.7 | 464 | 0.05 | 6 |
| Example 3 | 41.9 | <36 | 0.02 | 4 |
| Comparative Example 1 | 101 | 35000 | — | 2 |
| Comparative Example 2 | 288 | <500 | — | 11 |

Thus, the inventive process is able to reduce the amount of water consumed during the extraction significantly, while the extraction time is reduced. Furthermore, the resulting solution for the recovery of the solvent (NMMO) has a much higher concentration, enabling a more efficient recovery of said solvent.

What is claimed is:

1. A process for recovering a solvent from solvent-containing cellulosic particles, wherein the solvent is a direct dissolution solvent, comprising the steps:
    a) initially extracting the solvent from the solvent-containing cellulosic particles by means of a liquid extraction medium consisting essentially of water, thereby obtaining a solvent-enriched extraction medium, and
    b) obtaining a recovered solvent from the solvent-enriched extraction medium,
    wherein in step a) the solvent is extracted from the solvent-containing cellulosic particles in a continuous flow extraction reactor, wherein the liquid extraction medium continuously flows through the continuous flow extraction reactor to extract the solvent from the solvent-containing cellulosic particles.

2. The process according to claim 1, wherein the solvent-containing cellulosic particles are obtained from a production waste of processes for producing regenerated cellulosic molded bodies, optionally from a lyocell spinning dope waste.

3. The process according to claim 2, wherein the solvent is an amine oxide, optionally NMMO.

4. The process according to claim 1, wherein the empty continuous flow extraction reactor is filled with the solvent-containing cellulosic particles prior to step a).

5. The process according to claim 1, wherein the solvent-containing cellulosic particles are contained in an aqueous suspension when filling the empty continuous flow extraction reactor.

6. The process according to claim 5, wherein excess liquid is removed from the aqueous suspension prior to filling the continuous flow extraction reactor with the aqueous suspension.

7. The process according to claim 6, wherein the aqueous suspension is filled via a bow-shaped sieve into the continuous flow extraction reactor in order to remove the excess liquid from the aqueous suspension.

8. The process according to claim 1, wherein the continuous flow extraction reactor has a top inlet and a bottom sieve outlet for the solvent-enriched extraction medium and the liquid extraction medium flows from top to bottom in the continuous flow extraction reactor.

9. The process according to claim 8, wherein the solvent-enriched extraction medium is obtained from the liquid extraction medium exiting the bottom sieve outlet of the continuous flow extraction reactor.

10. The process according to claim 1, wherein in step a), the liquid extraction medium continuously flows through the continuous flow extraction reactor, until a content of the solvent in the solvent-enriched extraction medium below a predefined residual value is reached.

11. The process according to claim 10, wherein after the content of the solvent in the solvent-enriched extraction medium below the predefined residual value is reached, a continuous flow of the liquid extraction medium through the continuous flow extraction reactor is stopped and the continuous flow extraction reactor is emptied.

12. The process according to claim 11, wherein after emptying the continuous flow extraction reactor, essentially solvent-free cellulosic particles are pressed and/or dried.

13. The process according to claim 1, wherein the recovered solvent is obtained from the solvent-enriched extraction medium.

* * * * *